(12) United States Patent
Petersen et al.

(10) Patent No.: US 7,860,967 B2
(45) Date of Patent: Dec. 28, 2010

(54) NETWORK PROCESSOR SYSTEM INCLUDING A CENTRAL PROCESSOR AND AT LEAST ONE PERIPHERAL PROCESSOR

(75) Inventors: Brian A. Petersen, San Francisco, CA (US); Mark A. Ross, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 11/328,655

(22) Filed: Jan. 10, 2006

(65) Prior Publication Data

US 2006/0117088 A1 Jun. 1, 2006

Related U.S. Application Data

(63) Continuation of application No. 09/469,409, filed on Dec. 22, 1999, now Pat. No. 6,985,964.

(51) Int. Cl.
*G06F 15/173* (2006.01)
*H04L 12/28* (2006.01)
*G06F 15/16* (2006.01)
*H04L 12/56* (2006.01)

(52) U.S. Cl. .................. 709/224; 709/223; 709/230; 709/246; 370/389; 370/392; 370/393; 370/394

(58) Field of Classification Search .............. 709/223, 709/224, 230, 246; 370/389, 392–394
See application file for complete search history.

(56) References Cited

U.S. PATENT DOCUMENTS 5,414,650 A * 5/1995 Hekhuis .................... 708/203

(Continued)

OTHER PUBLICATIONS

Newman, Peter, et al. "IP Switching and Gigabit Routers," IEEE Communications Magazine, vol. 35, Issue 1, Jan. 1997, pp. 64-69.*

(Continued)

*Primary Examiner*—Vivek Srivastava
*Assistant Examiner*—Melvin H Pollack
(74) *Attorney, Agent, or Firm*—Campbell Stephenson LLP

(57) ABSTRACT

The present invention consists of a general purpose, software-controlled central processor (CP) augmented by a set of task specific, specialized peripheral processors (PPs). The central processor accomplishes its functions with the support of the PPs. Peripheral processors may include but are not limited to a packet parser, which provides the central processor with a numerical summary of the packet format; a packet deconstructor, which extracts designated fields from the packet the positions of which are determined by the central processor according to the packet format; a search engine, which is supplied a lookup index by and returns its results to the central processor; and a packet editor which modifies the packet as determined by the central processor using (in part) information returned from other peripherals. At each step in the use of this network processor system, the central processor has an opportunity to intervene and modify the handling of the packet based on its interpretation of PP results. The programmable nature of the CP and the PPs provides the system with flexibility and adaptability: rather than having to modify a circuit or system design in an ASIC or other hardware, new packet processing applications may be accommodated through the development of new software and its deployment in the central and/or peripheral processors.

20 Claims, 2 Drawing Sheets

U.S. PATENT DOCUMENTS

| | | | | |
|---|---|---|---|---|
| 5,414,704 A * | 5/1995 | Spinney | | 370/389 |
| 5,453,979 A * | 9/1995 | Schibler et al. | | 370/395.32 |
| 5,524,254 A * | 6/1996 | Morgan et al. | | 709/245 |
| 5,566,170 A | 10/1996 | Bakke et al. | | 370/392 |
| 5,598,410 A * | 1/1997 | Stone | | 370/469 |
| 5,613,071 A | 3/1997 | Rankin et al. | | 707/10 |
| 5,684,954 A | 11/1997 | Kaiserswerth | | 709/236 |
| 5,684,962 A * | 11/1997 | Black et al. | | 709/238 |
| 5,724,587 A | 3/1998 | Carmon et al. | | 718/104 |
| 5,754,553 A * | 5/1998 | Shimoda | | 370/471 |
| 5,761,191 A | 6/1998 | VanDervort et al. | | 370/232 |
| 5,774,675 A | 6/1998 | Uchida | | 709/246 |
| 5,809,334 A * | 9/1998 | Galdun et al. | | 710/22 |
| 5,812,882 A * | 9/1998 | Raji et al. | | 710/72 |
| 5,842,224 A | 11/1998 | Fenner | | 711/202 |
| 5,864,738 A | 1/1999 | Kessler et al. | | 709/239 |
| 5,946,679 A * | 8/1999 | Ahuja et al. | | 707/3 |
| 5,951,651 A | 9/1999 | Lakshman et al. | | 709/239 |
| 5,966,528 A * | 10/1999 | Wilkinson et al. | | 712/222 |
| 5,978,844 A * | 11/1999 | Tsuchiya et al. | | 709/221 |
| 5,978,951 A * | 11/1999 | Lawler et al. | | 714/758 |
| 5,982,749 A * | 11/1999 | Daniel et al. | | 370/395.21 |
| 5,996,021 A | 11/1999 | Civanlar et al. | | 709/238 |
| 6,005,860 A * | 12/1999 | Anderson et al. | | 370/352 |
| 6,018,524 A | 1/2000 | Turner et al. | | 370/392 |
| 6,052,383 A | 4/2000 | Stoner et al. | | 370/466 |
| 6,065,064 A | 5/2000 | Satoh et al. | | 709/249 |
| 6,069,895 A | 5/2000 | Ayandeh | | 370/399 |
| 6,078,593 A | 6/2000 | Eames et al. | | 370/498 |
| 6,078,963 A * | 6/2000 | Civanlar et al. | | 709/238 |
| 6,092,174 A | 7/2000 | Roussakov | | 712/15 |
| 6,101,551 A | 8/2000 | Kanoh | | 709/245 |
| 6,122,275 A * | 9/2000 | Karol et al. | | 370/389 |
| 6,128,666 A | 10/2000 | Muller et al. | | 709/238 |
| 6,141,705 A * | 10/2000 | Anand et al. | | 710/15 |
| 6,147,987 A * | 11/2000 | Chau et al. | | 370/352 |
| 6,160,809 A | 12/2000 | Adiletta et al. | | 370/392 |
| 6,172,990 B1 * | 1/2001 | Deb et al. | | 370/474 |
| 6,185,607 B1 | 2/2001 | Lo et al. | | 709/213 |
| 6,188,686 B1 | 2/2001 | Smith | | 370/388 |
| 6,201,755 B1 * | 3/2001 | Pillar et al. | | 365/230.01 |
| 6,219,352 B1 | 4/2001 | Bonomi et al. | | 370/417 |
| 6,226,267 B1 | 5/2001 | Spinney et al. | | 370/235 |
| 6,233,233 B1 | 5/2001 | Heo | | 370/352 |
| 6,243,384 B1 | 6/2001 | Eriksson et al. | | 370/395.31 |
| 6,266,338 B1 | 7/2001 | Simon et al. | | 370/412 |
| 6,266,706 B1 * | 7/2001 | Brodnik et al. | | 709/242 |
| 6,275,953 B1 | 8/2001 | Vahalia et al. | | 714/11 |
| 6,301,257 B1 | 10/2001 | Johnson et al. | | 370/406 |
| 6,304,912 B1 | 10/2001 | Oguchi et al. | | 709/238 |
| 6,373,846 B1 * | 4/2002 | Daniel et al. | | 370/395.65 |
| 6,393,026 B1 | 5/2002 | Irwin | | 370/401 |
| 6,407,996 B1 | 6/2002 | Witchalls | | 370/352 |
| 6,421,321 B1 | 7/2002 | Sakagawa et al. | | 370/238.1 |
| 6,421,730 B1 * | 7/2002 | Narad et al. | | 709/236 |
| 6,421,746 B1 | 7/2002 | Sheikh et al. | | 710/48 |
| 6,424,659 B2 * | 7/2002 | Viswanadham et al. | | 370/469 |
| 6,424,989 B1 * | 7/2002 | Shaw et al. | | 709/201 |
| 6,426,957 B1 | 7/2002 | Hauser et al. | | 370/413 |
| 6,430,184 B1 * | 8/2002 | Robins et al. | | 370/392 |
| 6,434,620 B1 * | 8/2002 | Boucher et al. | | 709/230 |
| 6,442,758 B1 | 8/2002 | Jang et al. | | 725/119 |
| 6,449,272 B1 * | 9/2002 | Chuah et al. | | 370/389 |
| 6,519,636 B2 * | 2/2003 | Engel et al. | | 709/223 |
| 6,526,452 B1 | 2/2003 | Petersen et al. | | 709/251 |
| 6,529,508 B1 | 3/2003 | Li et al. | | 370/392 |
| 6,535,512 B1 * | 3/2003 | Daniel et al. | | 370/395.1 |
| 6,594,704 B1 * | 7/2003 | Birenback et al. | | 709/238 |
| 6,600,741 B1 * | 7/2003 | Chrin et al. | | 370/375 |
| 6,600,744 B1 * | 7/2003 | Carr et al. | | 370/392 |
| 6,611,872 B1 | 8/2003 | McCanne | | 709/238 |
| 6,611,875 B1 | 8/2003 | Chopra et al. | | 709/245 |
| 6,628,614 B2 * | 9/2003 | Okuyama et al. | | 370/230.1 |
| 6,628,653 B1 * | 9/2003 | Salim | | 370/389 |
| 6,633,563 B1 * | 10/2003 | Lin et al. | | 370/389 |
| 6,646,985 B1 * | 11/2003 | Park et al. | | 370/229 |
| 6,650,644 B1 * | 11/2003 | Colley et al. | | 370/395.21 |
| 6,658,002 B1 | 12/2003 | Ross et al. | | 370/392 |
| 6,665,673 B1 | 12/2003 | Petersen et al. | | 707/10 |
| 6,675,222 B1 | 1/2004 | Petersen et al. | | 709/232 |
| 6,678,283 B1 * | 1/2004 | Teplitsky | | 370/463 |
| 6,707,814 B1 * | 3/2004 | Ohgane | | 370/389 |
| 6,714,553 B1 * | 3/2004 | Poole et al. | | 370/412 |
| 6,721,315 B1 * | 4/2004 | Xiong et al. | | 370/389 |
| 6,754,206 B1 * | 6/2004 | Nattkemper et al. | | 370/369 |
| 6,754,211 B1 * | 6/2004 | Brown | | 370/389 |
| 6,769,032 B1 * | 7/2004 | Katiyar et al. | | 709/246 |
| 6,862,624 B2 | 3/2005 | Colby et al. | | 709/226 |
| 6,889,257 B1 * | 5/2005 | Patel | | 709/232 |
| 6,907,001 B1 * | 6/2005 | Nakayama et al. | | 370/230 |
| 6,985,964 B1 * | 1/2006 | Petersen et al. | | 709/244 |
| 7,143,231 B1 * | 11/2006 | Srinivasan et al. | | 711/108 |

OTHER PUBLICATIONS

Partridge, Craig, et al. "A 50-Gb/s IP Router," IEEE/ACM Transactions on Networking, vol. 6, No. 3, Jun. 1998, pp. 237-248.*

* cited by examiner

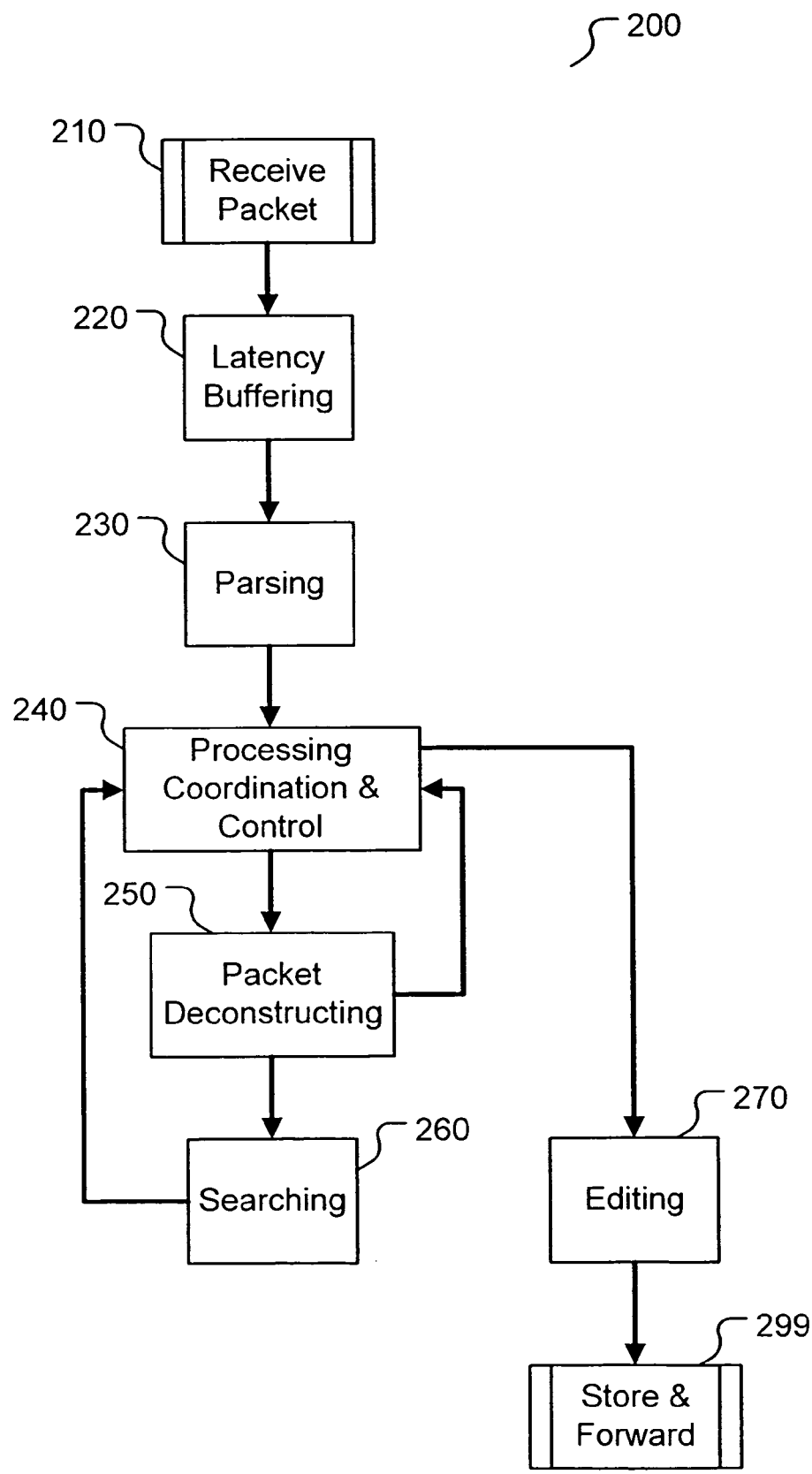

NETWORK PROCESSOR SYSTEM INCLUDING A CENTRAL PROCESSOR AND AT LEAST ONE PERIPHERAL PROCESSOR

CROSS-REFERENCE TO RELATED APPLICATIONS

This application is a continuation of Ser. No. 09/469,409, filed Dec. 22, 1999, now U.S. Pat. No. 6,985,964 B1, entitled "Network Processor System Including a Central Processor And At Least One Peripheral Processor," issued on Jan. 10, 2006, and naming Brian A. Petersen and Mark A. Ross as inventors. This application is hereby incorporated by reference, in their entirety and for all purposes.

BACKGROUND OF THE INVENTION

1. Field of the Invention

This invention relates to the field of network processors, specifically network processors adapted to perform packet processing.

2. Description of the Related Art

In the data networking field there exists a long felt need to provide faster packet processing using fewer system resources and more efficient hardware. Those of ordinary skill in the art have long realized that a programmable processing system can be readily adapted to provide packet processing. However, such systems are typically implemented in custom or semi-custom application specific integrated circuits (ASICs) which are difficult and costly to develop and produce. Furthermore, such ASICs are not readily changeable in the event that packet configurations, processing requirements, or standards change over time.

What is needed is a rapidly adaptable packet processing system able to be easily configured to perform a wide range of packet processing tasks without redesign or reconstruction of the processor system hardware itself.

SUMMARY

Presently disclosed is a general purpose, software-controlled central processor augmented by a set of task specific, specialized peripheral processors (simply referred to as "peripherals"). The central processor accomplishes its software-determined functions with the support of the peripheral processors. Peripheral processors may include but are not limited to a packet parser, which provides the central processor with a numerical summary of the packet format; a packet deconstructor, which extracts designated fields from the packet, the positions of which are determined by the central processor according to the packet format; a search engine, which is supplied a lookup index by and returns its results to the central processor; and a packet editor which modifies the packet as determined by the central processor using the previously-identified information from other peripherals.

At each step in the use of this network processor system, the central processor has an opportunity to intervene and modify the handling of the packet based on its current interpretation of peripheral processor results. The programmable nature of the central processor and the peripheral processors provides the system with flexibility and adaptability. Rather than having to modify a circuit or system design in an ASIC or other complex hardware device, new packet processing applications may be accommodated through the development of new software and its deployment in the central and/or peripheral processors.

BRIEF DESCRIPTION OF THE DRAWINGS

The present disclosure may be better understood and its numerous features and advantages made apparent to those skilled in the art by referencing the accompanying drawings.

FIG. 2 is a flowchart of the sequence of events by which a packet is processed according to one embodiment of the present invention.

The use of the same reference symbols in different drawings indicates similar or identical items.

DETAILED DESCRIPTION

Architecture

Figure 1:
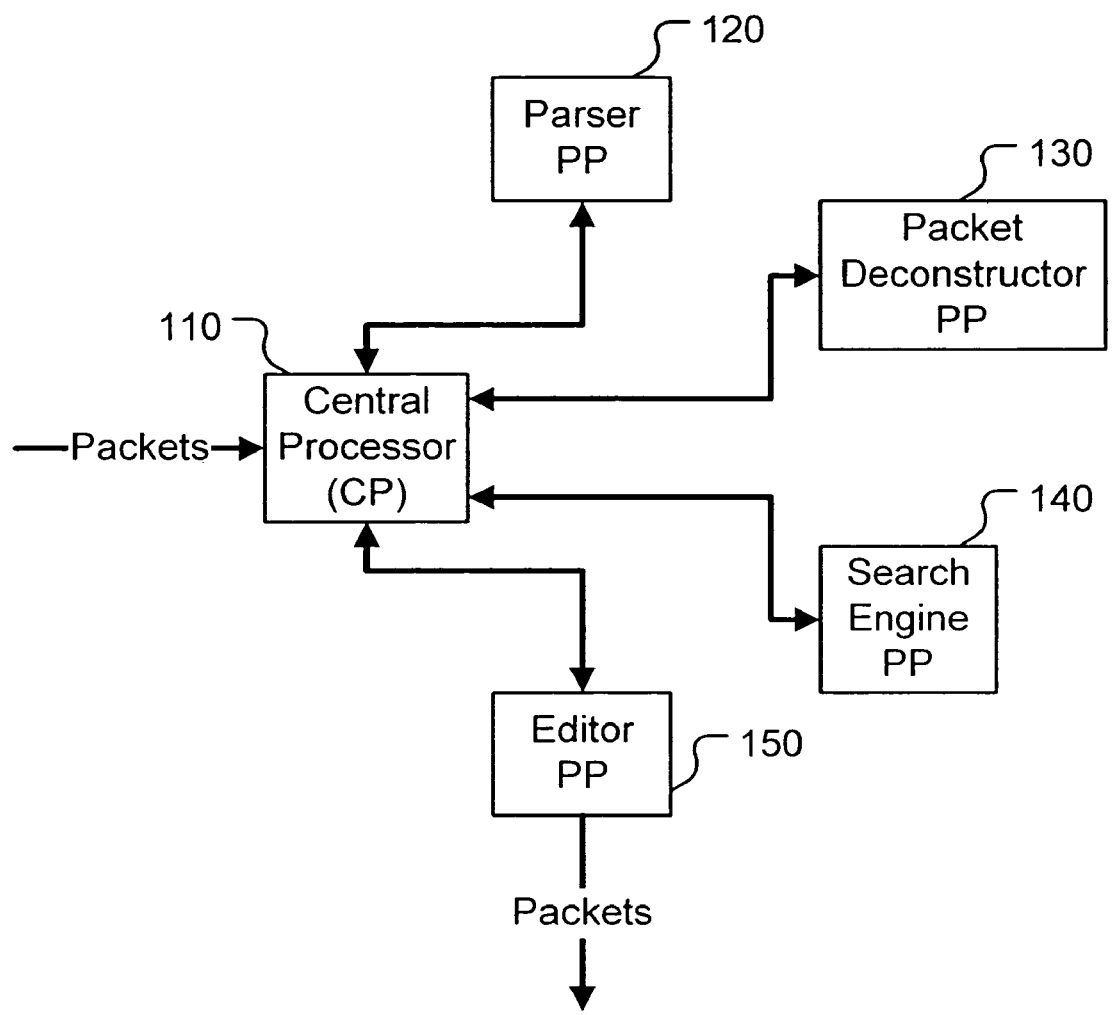
FIG. 1 is a high-level block diagram of the central processor/peripheral processor architecture according to one embodiment of the present invention.

The network packet processor system of one embodiment of the present invention comprises a central processor (CP) and a set of peripheral processors (PP). In some embodiments of this architecture, the peripheral processors each communicate only with the central processor; they do not communicate with each other. In other embodiments, the PPs can share information either passed from the CP or derived within one or more PPs with other PPs. The CP acts as the coordinating and controlling processor while each peripheral processor performs specialized tasks with high efficiency. The advantage of this architecture is that the individual processor (CP and PP) workflows, tasks, and functions are completely modularized and configurable by appropriate processor programming.

FIG. 1 shows a high-level block diagram of the present central/peripheral processor system architecture 100 for packet processing. Central processor 110 receives packets through any of a number of means well-known in the art. central processor 110 performs, in some embodiments, preliminary format checking, e.g., checksum validation, and passes the packet or parts of the packet to one or more peripheral processors for additional work. central processor 110 may pass data to one or more peripheral processors 120, 130, 140, and 150 in sequence, in parallel, or in a pipelined fashion.

Central processor 110 is a general purpose programmable processor, such as (but not limited to) an embedded processor core available from Tensilica, Inc. of Santa Clara, Calif. or Advanced RISC Machines (ARM) Ltd. of Cambridge, England. In some embodiments of the present invention, the embedded core forming central processor 110 is part of an application specific integrated circuit (ASIC).

In one embodiment of the present invention, shown in FIG. 1, four peripheral processors 120, 130, 140, and 150 are employed. One of ordinary skill in the art will readily see that fewer or more PPs may be employed without deviating from the spirit of the present invention. Accordingly, the present architecture is not limited to a certain number of peripheral processors.

Peripheral processors 120, 130, 140, and 150 may each be implemented independently in any form of processing module or ASIC known in the electronic arts. For instance, any PP may be a collection of discrete, fixed (hard-wired) logic, a programmable or fixed state machine, a microsequencer or microprocessor, a stored program-controlled processor using either ROM or RAM storage or a combination thereof, or a general-purpose, fully programmable computer. Any implementation form may be selected according to the tasks and functions of each PP and network packet processor system 100 overall. Accordingly, the present invention is not limited in the physical implementation of any PP.

In some embodiments of the present invention, central processor 110 and one or more PPs are contained in the same ASIC.

Sequence of Events

In the embodiment of FIG. 1, the four PPs are packet parser 120, packet deconstructor 130, search engine 140, and packet editor 150. Each performs specific functions at the request of central processor 110 and returns results to central processor 110.

Packets are received and delivered simultaneously to packet parser 120. A buffer (not shown) may also be employed to provide latency compensation, as is well-known in the art. Packet error detection code(s), such as the well-known cyclic redundancy check (CRC) field, are verified if present. Reception errors are flagged and included as part of a status word that is associated with the packet by packet parser 120.

The packet is deposited into a latency buffer primarily to allow a minimum amount of data to accumulate for address lookup purposes. The latency buffer makes the receive packet data available to packet deconstructor 130 and central processor 110 prior to the packet being stored in a central packet data buffer (not shown).

Packet parser 120 takes a quick look at the received packet and assigns a "vector" to the packet that indicates to central processor 110 in which of several categories (based on, e.g., packet formats) the packet belongs. A vector, as used here, is an identifying number or data field, such as simple byte code "0xF8" (F8 in hexadecimal notation). The vector can be one or more bits, bytes, or words. This provides central processor 110 a head start in the processing of the receive packet. Knowing the packet vector, central processor 110 knows where in the packet the fields of interest are located without having to examine the packet itself. This knowledge is stored in central processor 110, in one embodiment, using templates that indicate the desired fields for each vector, i.e., for each type of packet. Operationally, if the packet conforms to one of several expected formats as indicated by the vector, the appropriate processing template held within packet deconstructor 130 is selected by central processor 110. Packet deconstructor 130 executes the selected template by reading the required data directly from the latency buffer using pointers maintained by the latency buffer.

Packet deconstructor PP 130 delivers one set of selected fields to central processor 110 and accumulates a (possibly different) set of fields into a search argument that it delivers (in some embodiments) directly to search engine PP 140. In other embodiments, the accumulated search argument is delivered to search engine 140 via central processor 110.

In either event, the search argument is used to extract routing information, such as the destination port, MAC address, or IP address (as appropriate to the routing level of interest) from the routing data structures, which in some embodiments consist of tables. Various types of packet routing lookups can be performed by search engine 140, such as the well-known OSI Layer 2, Layer 3, and/or Layer 4 lookups. The search yields search results that are returned to central processor 110. Typically, only one of the lookups results in a destination determination; the layer 2 destination address lookup, in particular, determines which lookup identifies the packet's next destination. Central processor 110 has the option of examining the search results and modifying the destination returned by the lookups as necessary, in case of error or exception.

Editor PP 150 uses the information derived from parser 120, packet deconstructor 130, search engine 140, and central processor 110 to modify the packet (especially its header) in order to guide the packet to its next destination. This is the last step of the well-known routing/switching function performed by most packet processing systems.

Before the packet is forwarded by the switch/router, it is stored (buffered) in a packet data buffer (not shown). Such storage, including all necessary queuing, flow management, buffer management, retrieval and outbound (egress) forwarding and the like, may be accomplished by any of a number of means well-known in the packet processing and networking arts. Accordingly, packet storage (and subsequent retrieval) will not be further discussed herein.

FIG. 2 is a flowchart of the sequence of events discussed above. Packet processing 200 begins with packet reception 210 and buffering 220 to accommodate latency. Packet parsing 230 is next accomplished to determine a packet vector by which the packet is internally identified.

Processing coordination and control 240 evaluates the packet vector and passes the packet (either directly or by reference) to packet deconstructing step 250. Packet deconstructing 250 deconstructs the packet into its constituent parts, e.g., header fields, quality of service (QoS) bits, packet data payload, etc. The results of deconstructing 250 are passed back to processing step 240 and, in some embodiments, directly to searching (lookup) step 260.

Lookup results from search step 260 are returned to processing step 240 where they are used to control packet editing step 270. The revised packet is then sent for storage and forwarding 299 by means well-known in the art.

At any time in process 200, processing step 240 may, upon evaluation of the results of any PP step 230, 250, 260, or 270, redirect or alter the processing scheme according to its own (i.e., the central processor's) programming. Such redirection may occur, for instance, on an error or exception condition, such as the failure of a packet to pass a CRC check or the receipt of an illegal format.

ALTERNATE EMBODIMENTS

While central processor 110 is described as a single, monolithic processor, nothing in the architecture of the present invention so limits its implementation. In particular, central processor 110 can be formed as an interconnected network or mesh of two or more processors acting in concert. These processors forming central processor 110 may be implemented in the same ASIC or other integrated circuit device or on multiple ASICs or other integrated circuit devices. Such multi-processor implementations of a single processing function (such as that of central processor 110) are well-known to those of ordinary skill in the art.

Furthermore, while central processor 110 may be implemented as one or more interconnected processors, the peripheral processors, as a group, may also be implemented in one or more "sets" of PPs in order to pipeline or parallel packet processing across multiple peripheral sets under the control of a single central processor entity. As with central processor 110, the above-described PPs may be implemented on one or more ASICs or other integrated circuit devices.

In a further alternative embodiment, central processor 110 and the peripheral processors (in one embodiment, PPs 120, 130, 140, and 150) share a common set of registers in order to speed up data transfer between them and calculations using the same data. Some or all of the registers used by central processor 110 and all or some of the peripheral processors may be logically mapped to the same memory locations or otherwise shared by means long known in the computer and microcomputer/microprocessor arts.

The order in which the processing steps of any embodiment of the present invention are performed is purely illustrative in nature. In fact, these steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may be in the form of computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. An apparatus comprising:
    a first peripheral processor, wherein
        said first peripheral processor is configured to perform a first packet processing task,
        said first packet processing task is at least one packet processing task of a set of a packet processing tasks, and
        each packet processing task of said set of packet processing tasks is one of
            packet parsing,
            packet deconstruction,
            packet searching, and
            packet editing;
    a second peripheral processor, wherein
        said second peripheral processor is configured to perform a second packet processing task,
        said second packet processing task is one of a plurality of packet processing tasks, and
        said plurality of packet processing tasks comprises said each packet processing task of said set of packet processing tasks; and
    a central processor configured to
        receive a packet, wherein
            said packet comprises information,
        process said packet by virtue of being configured to
            cause said first peripheral processor to perform said first packet processing task, wherein
                said first packet processing task is performed using said information,
            determine said second packet processing task by virtue of being configured to evaluate a result of said first packet processing task, and
            cause said second peripheral processor to perform said second packet processing task.

2. The apparatus of claim 1, wherein
said first and said second peripheral processors are configured to perform each of said plurality of said packet processing tasks.

3. The apparatus of claim 1, further comprising:
a plurality of peripheral processors, wherein
    said plurality of peripheral processors comprise said first and said second peripheral processors, and
    each of said plurality of peripheral processors is configured to perform one of said packet processing tasks.

4. The apparatus of claim 3, wherein
said central processor and said plurality of peripheral processors are configured to perform certain ones of said packet processing tasks sequentially and certain others of said packet processing tasks in parallel.

5. The apparatus of claim 3, wherein
said central processor is coupled to control said plurality of peripheral processors,
said central processor is configured to cause each of said plurality of peripheral processors to perform at least one of said at least one of said packet processing tasks, and
said central processor and said plurality of peripheral processors are configured to communicate with one another.

6. The apparatus of claim 5, wherein
said plurality of peripheral processors comprise at least one of a packet parsing processor, a packet deconstruction processor, a search engine processor and a packet editing processor.

7. The apparatus of claim 6, wherein
said packet editing processor is configured to modify routing information in a header of said packet using information provided by at least one of said packet parsing processor, said packet deconstruction processor and said search engine processor.

8. The apparatus of claim 5, wherein
said plurality of peripheral processors comprise a packet parsing processor, and
said packet parsing processor is configured to generate a numerical summary of said packet.

9. The apparatus of claim 8, wherein
said central processor is further configured to cause said packet parsing processor to perform said generating, and
said packet parsing processor is configured to provide said numerical summary to said central processor.

10. The apparatus of claim 5, wherein
said plurality of peripheral processors comprise a packet deconstruction processor, and
said packet deconstruction processor is configured to extract a field from said packet.

11. The apparatus of claim 10, wherein
said central processor is further configured to designate said field to communicate said designation to said packet deconstruction processor.

12. The apparatus of claim 5, wherein
said plurality of peripheral processors comprise a search engine processor, and
said search engine processor is configured to identify network information associated with said packet.

13. The apparatus of claim 12, wherein
said search engine processor is configured to perform said identification by virtue of being configured to determine routing information by virtue of being configured to perform a lookup operation in a routing information table.

14. The apparatus of claim 5, wherein
said plurality of peripheral processors comprise a packet editing processor, and
said packet editing processor is configured to modify information in said packet.

15. The apparatus of claim 14, wherein
said packet editing processor is configured to perform said modification by virtue of being configured to modify routing information in a header of said packet.

16. A method comprising:
receiving a packet by a central processor, wherein
said packet comprises information; and
processing said packet by performing a plurality of packet processing tasks, wherein
said processing comprises
causing a first peripheral processor to perform a first packet processing task on said packet, wherein
said first packet processing is performed using said information,
said first packet processing task is at least one packet processing task of a set of packet processing tasks,
each packet processing task of said set of packet processing tasks is one of
packet parsing,
packet deconstruction,
packet searching, and
packet editing,
determining a second packet processing task by causing said central processor to evaluate a result of said first packet processing task, and
causing a second peripheral processor to perform said second packet processing task on said packet, wherein
said second packet processing task is one of a plurality of packet processing tasks, and
said plurality of packet processing tasks comprises said each packet processing task of said set of packet processing tasks.

17. The method of claim 16, wherein said first peripheral processor is one of a plurality of peripheral processors, and said packet processing tasks comprise at least one of:
packet deconstruction, wherein said packet deconstruction comprises deconstructing said packet header to form header data;
packet searching, wherein said packet searching comprises searching one or more data structures based on said header data to produce search results; and
packet editing, wherein said packet editing comprises editing said packet based on said search results, said header data, and said vector, wherein each of said deconstructing, said searching and said editing are performed by a corresponding one of said peripheral processors.

18. The method of claim 17, wherein said processing further comprises:
monitoring said deconstructing, said searching, and said editing, and
causing said first and said second peripheral processors to share information regarding said packet among one another.

19. The method of claim 17, wherein:
said deconstructing further comprises forming a search argument;
said processing further comprises operating on said search argument to form a modified search argument prior to said searching; and
said searching uses said modified search argument.

20. An apparatus comprising:
a first peripheral processor, wherein
said first peripheral processor is configured to perform a first packet processing task,
said first packet processing task is at least one packet processing task of a set of a packet processing tasks, and
each packet processing task of said set of packet processing tasks is one of
packet parsing,
packet deconstruction,
packet searching, and
packet editing;
a second peripheral processor, wherein
said second peripheral processor is configured to perform a second packet processing task,
said second packet processing task is one of a plurality of packet processing tasks, and
said plurality of packet processing tasks comprises said each packet processing task of said set of packet processing tasks;
a central processor, coupled to control said first and said second peripheral processors, wherein
the central processor is configured to receive a packet, and
said packet comprises information; and
means for processing said packet, wherein
said means for processing comprises
means for causing said central processor to coordinate said packet processing tasks between said first and said second peripheral processors,
means for causing said first peripheral processor to perform said first packet processing task on said packet, wherein
said first packet processing task is performed using said information
means for causing said central processor to determine a second packet processing task of said packet processing tasks comprising
means for evaluating a result of said first packet processing task, and
means for causing said second peripheral processor to perform said second packet processing task on said packet.

* * * * *